(No Model.)
C. A. GILMAN.
CUTTER HEAD.
No. 303,147. Patented Aug. 5, 1884.
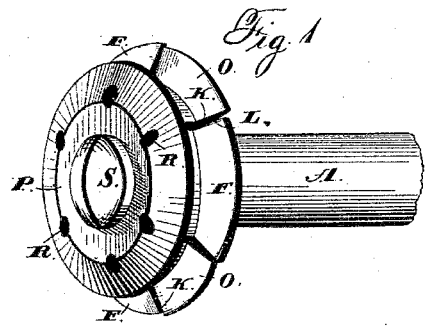
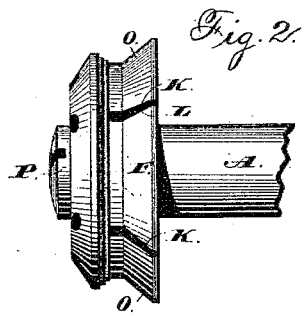
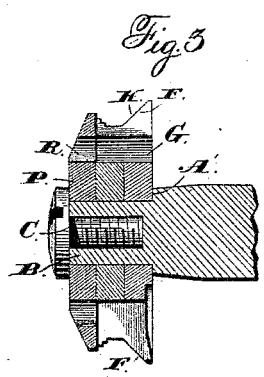
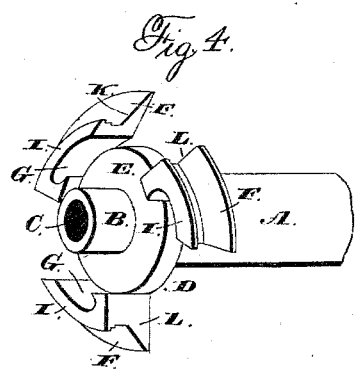
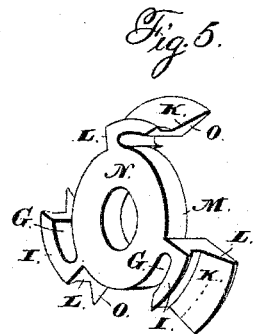
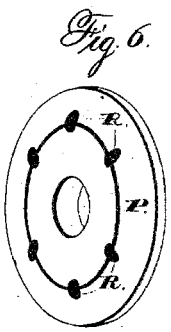
Witnesses:
Jas. E. Hutchinson.
Henry C. Hazard.
Inventor.
Charles A. Gilman
by Prindle and Russell
Attorneys.

UNITED STATES PATENT OFFICE.

CHARLES A. GILMAN, OF WORCESTER, MASSACHUSETTS, ASSIGNOR TO THE NEW ENTERPRISE EDGE TRIMMER COMPANY, OF SAME PLACE.

CUTTER-HEAD.

SPECIFICATION forming part of Letters Patent No. 303,147, dated August 5, 1884.

Application filed March 13, 1884. (No model.)

*To all whom it may concern:*

Be it known that I, CHARLES A. GILMAN, of Worcester, in the county of Worcester, and in the State of Massachusetts, have invented certain new and useful Improvements in Cutter-Heads; and I do hereby declare that the following is a full, clear, and exact description thereof, reference being had to the accompanying drawings, in which—

Figure 1 shows a perspective view of my improved cutter-head; Fig. 2, a view of the same in side elevation; Fig. 3, a view of a vertical axial section of the cutter-head and shaft; Fig. 4, a detail perspective view of one-half of the cutter-head in position on its shaft; Fig. 5, a similar view of the other half of the head detached; Fig. 6, a similar view of the guard-plate for the head, and Fig. 7 a detail perspective view of the screw used in holding the parts of the head together and on the shaft.

The object of my invention is to provide an improved cutter-head, which, while having its teeth close together, can still be readily sharpened; and to this end it consists in the construction, arrangement, and combination of parts, as hereinafter set forth, and more specifically pointed out in the claims.

My improved cutter-head is represented and described in a form designed for use in trimming the sole edge of a boot or shoe, and the contour of the periphery of the cutters is the converse of the edge desired to be produced upon a sole.

In the drawings, A designates the shaft upon which the cutter-head is to be fixed. As shown, this shaft, near its end, is reduced in size, so that a square shoulder, A', is formed on the shaft. The reduced portion B of the shaft is preferably cylindrical in shape, and is provided with an axial screw-threaded opening or bore, C, extending into a portion of or throughout its length. The cutter-head proper, which fits upon this reduced portion of the shaft, is, as shown in the drawings, formed in two parts. One of these parts, D, has the central disk-like portion, E, centrally bored to fit the part B of the shaft. Formed on the outer edge of this disk are the teeth F F, undercut so as to leave the spaces or openings G G extending rearward along the edge of the disk. With this construction the teeth then consist of the radial portions H H, attached to or formed on the disk edge, and the arms I I, extending around over the disk edge from the outer ends of portions H H at a distance from said disk edge in the direction in which the head is to revolve. The forward ends of these teeth are formed with cutting-edges K K, the arms I I being beveled away below to make an acute angle. The teeth, as seen in cross-section, are to be of any desired shape to suit the work to be done and the form of the cut to be made. As shown in the drawings, the peripheral line of each tooth retires or is curved inward from a true circle from the front edge of the tooth toward its rear. The peripheral surface will then be at an acute angle with the circle passing through the edges of the series of teeth and described from the axial center of the head. The rear face, L, of each tooth is preferably made radial. The teeth are, as shown, broader or thicker than the disk portion E of the head-section D. On the side which comes against the shoulder A' on the shaft the teeth are flush with the side of the disk, but on the other side they extend beyond the plane of the disk-face. The other half, M, of the head, also consists of a central disk, N, adapted to fit over the reduced end B of the shaft, and provided with teeth O O, like those on the half cutter-head D. The only difference in construction is that the teeth extend beyond the plane of the other side of the disk. When then the half-head M is placed in position on the shaft, its teeth will come between those on the half cutter-head D, and will be in line therewith, as shown in the drawings. The teeth can, of course, be of any desired number.

Clamped and firmly held against the outer side of the completed cutter-head is the guard-disk P, provided with openings R R, registering with the spaces between the teeth, so as to afford an easy clearance for the shavings. This plate and the parts of the cutter-head are held in place on the shaft by the screw S screwed into the threaded bore C. The function of the guard-plate is to keep the cutter out of contact with the upper of the shoe which is being trimmed. When the cutter-head is to be adapted for use for other purposes than for trimming shoe-soles, the guard-plate need not be used. As indicated above, the teeth can be of any desired number. If an odd number is found desirable, a portion of the teeth can be formed on one-half of the head and the rest on the other. As shown, spaces are left between the rear faces of the teeth and the cutting-edges of the teeth following them. The shavings pass down through these and find easy exit through the openings in the guard-plate. With the cutter-heads as heretofore made the teeth cannot be placed very near together, as spaces must be left to allow of access to the front end of each tooth to grind it. Where spaces have been left between the teeth sufficiently large to allow of grinding the cutting-edges, it has been found necessary to regulate the depth of the cut, and to produce a smooth surface on the object cut to provide guards between the teeth to prevent each succeeding tooth cutting too deeply. With my cutter-head as constructed a large number of teeth close together can be employed. In the drawings only six are shown; but I contemplate employing from twelve to twenty. They can be placed close together, only enough space between to allow of passage of shavings being necessary. When the teeth are to be sharpened, the two parts of the head are separated, and there will be space enough between the teeth on the halves to permit free and ready access to the fronts of the teeth to grind them. The two parts are then put together again, the teeth on one part occupying the spaces between the teeth on the other, and are clamped together and held on the shaft, either by the guard-plate being forced by the screws against the outer side of the cutter-head, or, where no guard-plate is needed, by the head of the screw, or a washer placed under the head pressing on the side of the outer cutter-disk.

Having thus described my invention, what I claim is—

1. The cutter-head formed in parts, each provided around its periphery with cutter-teeth projecting on one side beyond the face of the part, and adapted to occupy the spaces between the teeth on the other part, and means for rigidly clamping the parts together, substantially as and for the purpose described.

2. The cutter-head consisting of two disks, each provided with cutter-teeth alike in cross-section to those on the other, projecting radially from its periphery, and also in lines parallel with the axis of the disk beyond one side thereof, and adapted to occupy the spaces between and stand in line with the teeth on the other disk when the two are brought together, and means for rigidly clamping the disks together and holding the head thus formed on its shaft, substantially as shown and described.

3. In combination with the shouldered shaft, the cutter-head formed of the two disks, each having cutter-teeth alike in cross-section on its periphery projecting beyond its side, and adapted to stand between and in line with the teeth on the other when the disks are brought together, a guard-plate, and means adapted to hold the guard-plate and sections of the cutter-head rigidly together on the shaft, substantially as and for the purpose described.

4. In combination with the shouldered shaft, the two disks, each provided with cutting-teeth alike in transverse section on its periphery projecting over the periphery of the other between and in line with the teeth thereon, the guard-plate on the shaft outside of the disks, and a screw tapped into the end of the shaft, and adapted to force and hold the guard-plate inward to clamp the disks between it and the shoulder on the shaft, substantially as shown and described.

In testimony that I claim the foregoing I have hereunto set my hand this 16th day of February, A. D. 1884.

CHARLES A. GILMAN.

Witnesses:
STEDMAN CLARK,
ELMER P. HOWE.